US009588744B2

(12) United States Patent
Bienkowski et al.

(10) Patent No.: US 9,588,744 B2
(45) Date of Patent: *Mar. 7, 2017

(54) RENAMING INSTANCES OF AN ENTITY IN A CODING ENVIRONMENT

(71) Applicant: The MathWorks, Inc., Natick, MA (US)

(72) Inventors: Joseph R. Bienkowski, East Longmeadow, MA (US); John E. Booker, Jamaica Plain, MA (US); Srinath Avadhanula, Waltham, MA (US); Vijay Raghavan, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,008

(22) Filed: Aug. 5, 2014

(65) Prior Publication Data

US 2014/0351788 A1 Nov. 27, 2014

Related U.S. Application Data

(63) Continuation of application No. 13/238,852, filed on Sep. 21, 2011, now Pat. No. 8,806,430.

(60) Provisional application No. 61/494,725, filed on Jun. 8, 2011.

(51) Int. Cl.
G06F 9/44 (2006.01)
G06F 17/24 (2006.01)

(52) U.S. Cl.
CPC .............. *G06F 8/34* (2013.01); *G06F 8/33* (2013.01); *G06F 8/70* (2013.01); *G06F 8/72* (2013.01); *G06F 17/24* (2013.01)

(58) Field of Classification Search
CPC ..... G06F 8/34; G06F 8/72; G06F 8/70; G06F 8/33; G06F 8/71; G06F 8/20; G06F 17/24
USPC ........................................................ 717/113
See application file for complete search history.

(56) References Cited

U.S. PATENT DOCUMENTS

| 6,804,682 | B1 * | 10/2004 | Kemper et al. | |
|---|---|---|---|---|
| 2003/0014439 | A1 | 1/2003 | Boughannam | |
| 2004/0034848 | A1 | 2/2004 | Moore et al. | |
| 2005/0114771 | A1 | 5/2005 | Piehler et al. | |
| 2006/0293935 | A1 * | 12/2006 | Tsyganskiy et al. | 705/7 |
| 2007/0011651 | A1 * | 1/2007 | Wagner | 717/110 |
| 2008/0052684 | A1 * | 2/2008 | Bowdidge et al. | 717/136 |

(Continued)

*Primary Examiner* — Viva Miller
(74) *Attorney, Agent, or Firm* — Nelson Mullins Riley & Scarborough LLP

(57) ABSTRACT

Exemplary embodiments provide computer-implemented methods, computer-readable media, and systems for changing the identifier associated with an entity, such as a variable or function, in a portion of code. During editing, a reference may be maintained that identifies the location of each instance of the entity in the code. When the identifier associated with one instance of the entity is changed, the change in the identifier may be propagated throughout the code to change each instance of the identifier in the code. The identifier may be changed without interrupting the workflow of the user and without the need to change to a separate refactoring mode. In some embodiments, a syntactical analysis may be performed and some or all instances of the identifier may be changed based on one or more rules.

5 Claims, 8 Drawing Sheets

(56) References Cited

U.S. PATENT DOCUMENTS

| | | |
|---|---|---|
| 2008/0059431 A1 | 3/2008 | Aoki et al. |
| 2008/0189678 A1 | 8/2008 | Joo et al. |
| 2009/0013248 A1* | 1/2009 | Hutchison et al. ........... 715/256 |
| 2012/0192151 A1 | 7/2012 | Parkes et al. |
| 2012/0260236 A1 | 10/2012 | Basak et al. |
| 2012/0311546 A1* | 12/2012 | Fanning et al. .............. 717/136 |

* cited by examiner

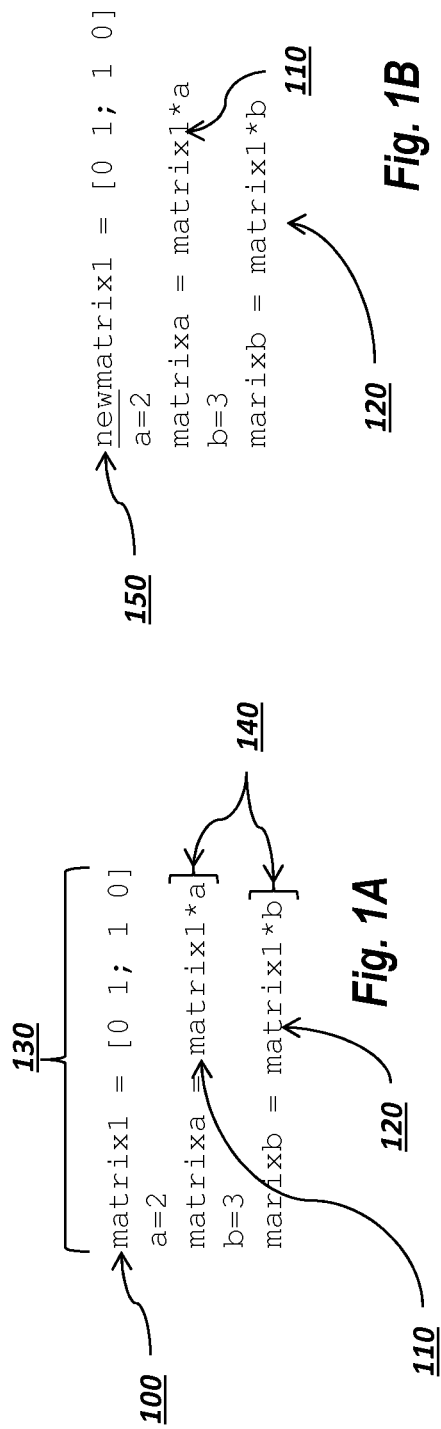

```
            210
             |
    →matrix1 = [0 1; 1 0]
100  a=2
     matrixa = newmatrix1*a
     b=3
     marixb = matrix1*b
                  ↑
                  |
                 120
```

Fig. 2A

```
     →function [out1, out2] = myfun(in1, in2)
230

→[first second] = myfun(one two)
240
```

Fig. 2B

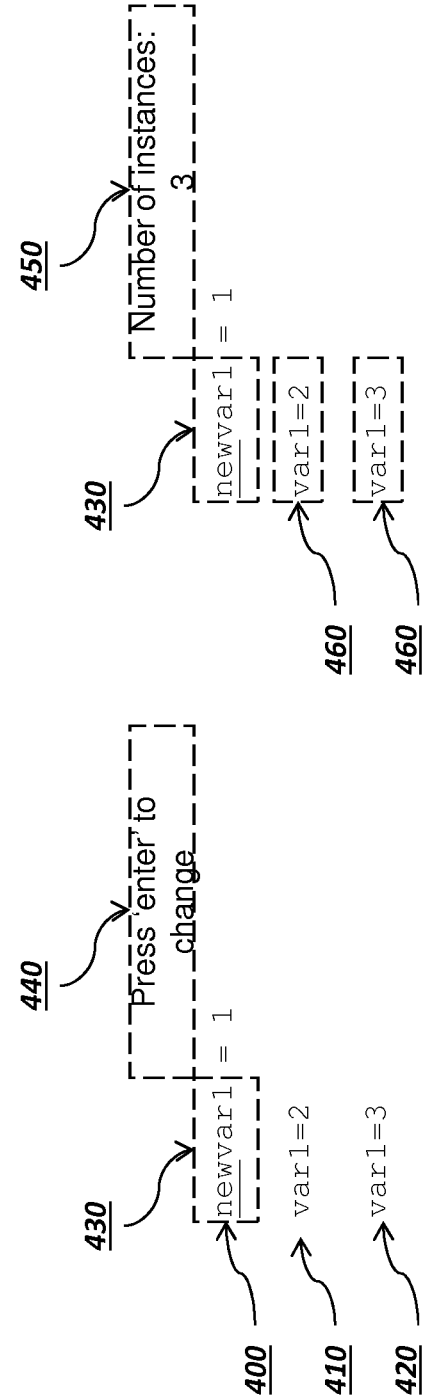

RENAMING INSTANCES OF AN ENTITY IN A CODING ENVIRONMENT

RELATED APPLICATIONS

This application is a continuation of U.S. patent application Ser. No. 13/238,852, filed Sep. 21, 2011, which claims priority to U.S. Patent Application No. 61/494,725, filed Jun. 8, 2011, entitled "RENAMING INSTANCES OF AN ENTITY IN A CODING ENVIRONMENT". The contents of the aforementioned applications are incorporated herein by reference.

BACKGROUND

Source code may be written in an environment known as a coding environment. Examples of coding environments include source code editors, debuggers, integrated development environments, and modeling environments. Coding environments may provide tools or features that simplify the task of writing source code. For example, some coding environments provide syntax highlighting, debugging, auto-complete, and bracket matching functionality.

One task performed in coding environments involves changing the identifier associated with an entity, such as a variable or a function. Such an identifier may be, for example, a variable name or function name. Because such entities may be instantiated multiple times, it may be necessary to change the identifier associated with multiple instances of the entity to effect the change throughout the code.

Conventionally, variables may be renamed in code using a find and replace feature. For example, a tool may be provided that searches the code for instances of a string and changes these instances to another string.

DESCRIPTION OF THE DRAWINGS

FIG. 1A depicts a portion of code including multiple instances of an entity.

FIG. 1B depicts the portion of code of FIG. 1A in which the identifier of the first instance of the entity is changed to a modified identifier.

FIG. 1C depicts the portion of code of FIG. 1A in which the identifiers of the second and third instances of the entity are changed to match the modified identifier.

FIG. 2A depicts the portion of code of FIG. 1A in which a change is made to the identifier of the second instance of the entity and a semantic rule is enforced.

FIG. 2B depicts an exemplary function declaration and a function call.

FIG. 3A depicts a portion of code including three instances of an entity.

FIG. 3B depicts the portion of code of FIG. 3A in which a change is made to the second instance of the entity.

FIG. 4A depicts the portion of code of FIG. 3A in which a change is made to the first instance of the entity and a graphical affordance is presented for requesting user input.

FIG. 4B depicts the portion of code of FIG. 3A in which a change is made to the first instance of the entity and a graphical affordance is presented for presenting information.

DETAILED DESCRIPTION

Figure 5:
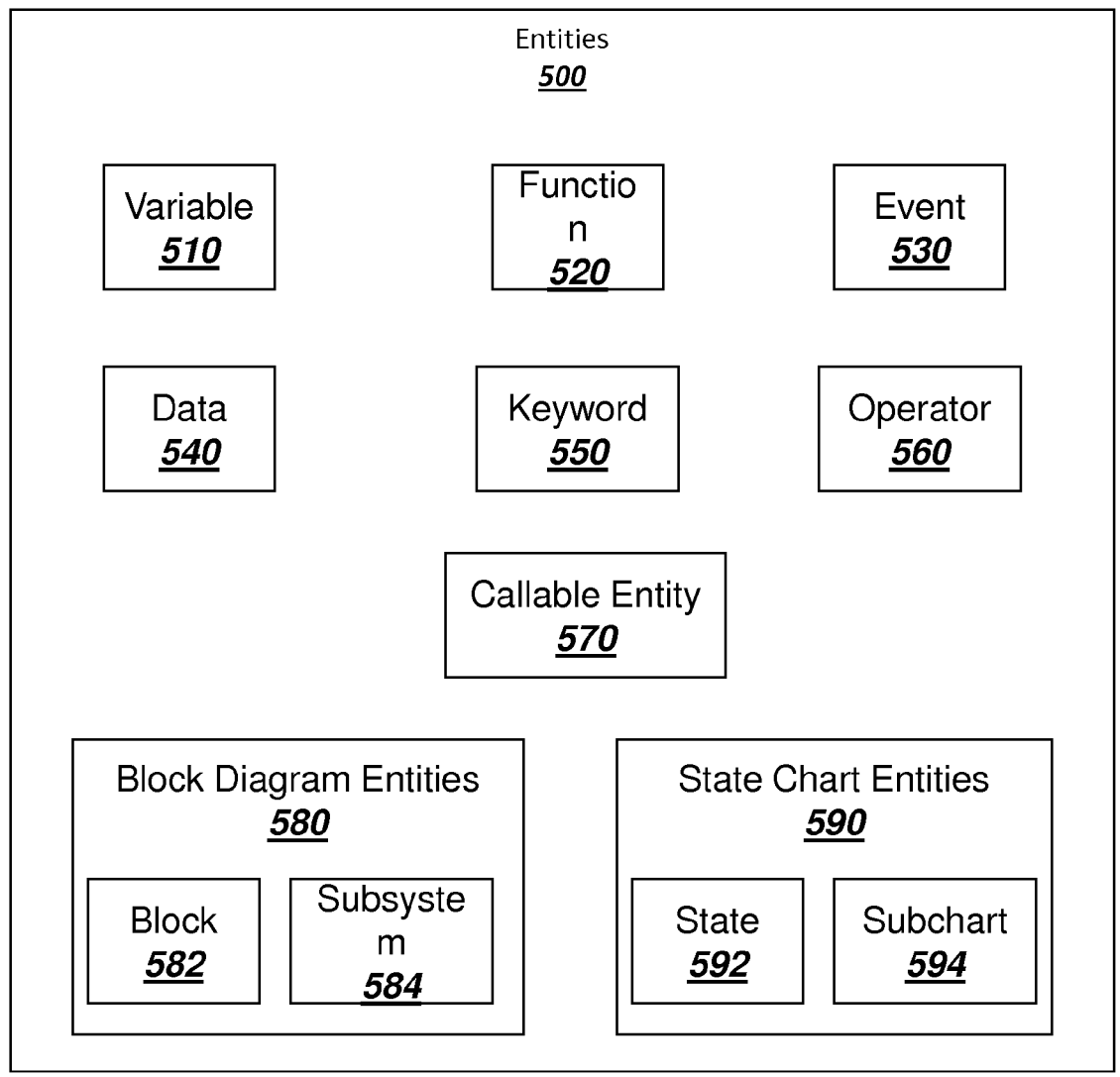
FIG. 5 is a chart depicting types of entities 500.

Using find and replace to change entity names may be inefficient and error prone. Find and replace typically does not distinguish between entity identifiers and parts of identifiers. Consider an example of code containing a first variable named "Variable," and a second variable named "Variable2." If a user wishes to change each instance of the first variable ("Variable") to use the modified identifier "NewVariable," the user would instruct the coding environment to find instances of "Variable" and replace each instance with the identifier "NewVariable." Because the identifier "Variable" is also a part of the identifier "Variable2," a simple find and replace causes each instance of "Variable2" to be renamed as "NewVariable2." This unintended behavior may result in errors that are difficult to locate and remedy.

Some coding environments provide automated find and replace functionality through a refactoring mode. A user may switch out of an editing mode and into the separate refactoring mode. For example, by right-clicking on "Variable" in the above example, a user may be presented with a pop-up menu that allows the user to refactor "Variable" by changing the identifier to "NewVariable." The coding environment may then execute a find and replace that accounts for (for example) whether the identifier to be refactored is an identifier or a portion of an identifier. Exact matches to the identifier may be renamed, while non-exact matches to the identifier (such as portions of the identifier) may be skipped over.

Although refactoring modes may distinguish between entity identifiers and parts of identifiers, switching from an editing mode to a refactoring mode requires that a user interrupt their workflow in order to change entity names. Furthermore, entering the refactoring mode is a manual activity and thus a user must know that the refactoring mode exists, how to launch it, and how to use it. Additionally, in some cases refactoring performs a real-time analysis of the code in order to change the variable names. In other words, it is only when a user requests that an entity name be refactored that the coding environment begins to search for and replace the names of other instances of the entity. Accordingly, refactoring may be time-consuming, particularly for large source code documents.

The techniques described herein allow an identifier associated with an entity, such as a variable or function, to be quickly and efficiently changed throughout a portion of code (or the entirety of the code). As described in more detail below, as the code is edited a reference may be maintained to each instance of the entity. When a change is detected in an identifier associated with one instance of the entity, the change in the identifier may be propagated throughout the code to change each instance of the identifier in the code. The identifier may be changed without interrupting the workflow of the user and without the need to change to a separate refactoring mode. In some embodiments, a semantic analysis may be performed and some or all instances of the identifier may be changed based on one or more rules.

An entity refers to a unit of code that can be identified by an identifier. Examples of entities, including variables, functions, operators, states in a state chart environment, blocks in a block diagram environment, lines between states or blocks (representing signals or transitions) and files, are described in detail below with respect to FIG. 5. In some cases, an entity may be instantiated multiple times. For example, a variable may be used in multiple places in the code, and a function may be called in multiple places. Each use of the entity in the code is an instance of the entity.

The identifier may be any suitable means for identifying the entity. For example, the identifier may be a string, name, or file/block path that identifies the entity and distinguishes the entity from other entities.

An example of changing an identifier associated with an instance of an entity is described below with reference to FIGS. 1A-1C. In FIG. 1A, a portion of code is depicted that includes three instances 100, 110, 120 of the entity "matrix1." Although each instance 100, 110, 120 is a separate instance, each instance is associated with the same identifier ("matrix1"), which indicates that each instance is an instance of the same entity.

The entity may be used in multiple ways, and hence different instances of the entity may be in different contexts. For example, in FIG. 1A the entity "matrix1" is assigned in a variable assignment 130, and is used in two variable uses 140 without assigning a new value to the entity.

As a user writes or edits code, the user may decide to change the identifier associated with the entity. For example, in FIG. 1B, the identifier ("matrix1") of the first instance of the entity is changed to a modified identifier 150 ("newmatrix1"). The change currently being made to the identifier is indicated in FIG. 1B through underlining, although this indication is exemplary only and it will be understood that other indication techniques may equally be used. FIG. 1B depicts the moment in time when the change is currently being made, for example, before any further actions have been carried out by the coding environment.

In some circumstances, it is desirable to propagate the change to the identifier throughout the code so that each instance (or, in certain cases, a subset of the instances) of the entity has their associated identifier changed to match the modified identifier 150. This change may be carried out automatically, without changing from an editing mode to a separate refactoring mode (for example, without a request to refactor the remaining instances of the entity). As shown in FIG. 1C, the coding environment may change the identifiers associated with the remaining instances of the entity so that each identifier matches the modified identifier 150.

In some circumstances, it may not be desirable to change the identifier associated with every instance of the entity. For example, the identifier may have been changed by mistake, or a user may wish to associate the instance with a different entity (e.g., change the instance from an instance of a first variable to an instance of a second variable).

The context of the change in the identifier may provide insight into whether a user intended for the change to be propagated throughout the code, or whether the user wished to make the change locally and/or to selected instances. According to exemplary embodiments, the context may be leveraged through a series of rules that indicate whether the change should be effected or not for the instances present.

FIG. 2A depicts the portion of code of FIG. 1A in which a change is made to the identifier of the second instance of the entity and a semantic rule is enforced to restrict the coding environment from changing other instances of the entity. In FIG. 2A, the identifier of the second instance of the entity is changed to become a modified identifier 210. However, in FIG. 2A, the change is made to an instance of the entity that is associated with a variable use (see 140 in FIG. 1A) as opposed to a variable assignment (see 130 in FIG. 1A). In this case, it may be determined that the change should not be propagated because the context (variable use) indicates a high likelihood that the user did not intend for the change to be propagated to other instances of the entity.

FIG. 2B depicts additional examples of contexts that may indicate whether a change is intended. In FIG. 2B, a function is declared in a function declaration 230. Additionally, the function is called in a function call 240. If a change is made to the identifier ("myfun") in the function declaration 230, this may indicate a high degree of likelihood that the user desires that the change be carried through the code. On the other hand, if a change is made to the identifier associated with the function call 240, this may indicate that the change is not intended to be carried through to other instances of the entity, and the coding environment may be restricted from propagating the change.

In some embodiments, changes may be propagated only in one direction through the code. For example, if a change is made to an identifier associated with an instance of an entity, only identifiers associated with instances that occur later (or earlier) in the code may be changed to match. Such an embodiment is shown in FIGS. 3A and 3B.

FIG. 3A depicts a portion of code including three instances 310, 320, 330 of an entity. Each instance involves a variable use. As indicated in FIG. 3B, a change may be made to the identifier associated with the second instance 320 of the entity. Accordingly, the identifier of the second instance 320 may be changed to a modified identifier 340. In this case, the change is propagated downward through the code. Therefore, the identifier 340 of the third instance of the entity is changed to match the identifier of the second instance, but the identifier of the first instance 310 of the entity remains the same.

In some cases, a graphical affordance may be presented that requests user input or that provides information about a change to an identifier. For example, in FIG. 4A, three instances 400, 410, 420 of an entity are present in a portion of code. A change to the identifier associated with the first instance 400 may be detected, and the first instance may be visually distinguished by a graphical affordance 430. The graphical affordance 430 may involve, for example, highlighting, a color change, a change in typeface, underlining, italicizing, dimming, or a combination of these techniques, among others. The graphical affordance 430 may indicate that a change to an identifier associated with an entity has been detected. It should be noted that the list of graphical affordances described herein is not intended to be exhaustive, and any examples provided are intended to be exemplary only. Additional types of graphical affordances may also be used.

A second graphical affordance 440 may also be presented. In the example of FIG. 4A, the second graphical affordance 440 requests input in order to propagate the change. The input may be, for example, input from a keyboard (e.g., pressing an enter key, space bar, or tab key) or mouse (e.g., left-clicking, right-clicking, or clicking the center-mouse button or scrolling the scroll wheel). The second graphical affordance 440 may indicate that the change will occur automatically in a certain amount of time if no input is received. Alternatively, the second graphical affordance 440 may indicate that the change can be canceled by providing certain input (e.g., pressing the escape key).

The portions of code described in FIG. 4A may be provided in a coding environment supporting an editing mode. It should be noted that in the example depicted in FIG. 4A, the coding environment may remain in the editing mode. That is, the change may occur without an indication that the coding environment should switch into a separate refactoring mode.

In some embodiments, a graphical affordance may provide information about the changes to be propagated throughout the code. For example, FIG. 4B depicts a third graphical affordance 450 which shows how many instances of the entity exist in the code that will be changed. Alternatively, the third graphical affordance may provide change information such as indicate how many instances of the entity exist in the code that will not be changed or a total number of instances in the code, including instances that will be changed and that will not be changed.

Remaining instances of the entity (either all the remaining instances or only the instances that will be changed) may be visually distinguished using a fourth graphical affordance 460, such as highlighting, a change in typeface, a change in font color, a change in background color, etc. In some embodiments, only the instances of the entity that are currently visible in a graphical user interface may be distinguished using the fourth graphical affordance 460. In some embodiments, instances of the entity that exist in the code but which are not currently visible in the graphical user interface may be presented, for example by providing thumbnail images showing the locations of the instances or a list of occurrences of the instances. Such a graphical affordance may be presented, for example, in a pop-up window or in a frame of the coding environment.

Multiple types of entities may be associated with identifiers. For example, FIG. 5 depicts types of entities 500 for which changes in associated identifiers may be propagated throughout the code in which the entity resides.

An entity may be a variable 510 and may be associated with an identifier such as a variable name, a variable identification number, or a reference to the variable 510 such as a pointer. Variables include, but are not limited to, boolean variables, strings, characters, enumerations, integers, and non-integer numerical variables such as doubles and floats.

A function 520 may be associated with a function name, function identification number, or a pointer to a definition of the function. Functions 520 are referred to by various names in different programming languages and may include (but are not limited to) subroutines, modules, procedures, methods, class functions, and instructions that may represent a particular task. Invoking the function 520 may cause the task to be carried out.

An event 530 includes an object or entity that can trigger an action in another object. For example, the occurrence of an event 530 may trigger a subsystem in a block diagram model to execute, a function to be called, or a state machine such as a statechart to awaken. An event may be identified, for example, by an event name.

Data 540 represents information that may be operated upon. Data 540 may include information represented in a data structure in the memory of a computing device, or may be persistently stored as a file in the memory of the computing device. Data 540 may be identified by a name of the data, a name of the data structure or file, or a path name, among other possibilities.

A keyword 550 is a word that has a particular meaning in a programming language. For example, a keyword 550 may indicate the start or end of a function definition, and may be a reserved word in the programming language. Examples of keywords 550 include, but are not limited to, "if," "then," "else," "end," "model," "connect," "private," etc. The use and specific types of keywords 550 may vary depending on the programming and/or modeling language employed. A keyword 550 may be represented by a symbol or name, among other possibilities.

An operator 560 may include a predefined or user-defined representation of an operation. An operator 560 may be mapped to instructions that operate on one or more operands associated with the operator 560. The use and specific types of operators 560 may vary depending on the programming and/or modeling language employed. Examples of operators 560 include, but are not limited to, "*," "+," and "=." An operator 560 may be represented by a symbol or name, among other possibilities.

A callable entity 570 is any type of entity that may be called or invoked in a programming and/or modeling language. An example of a callable entity 570 is a delegate, which may encapsulate an invocation list. Another example of a callable entity 570 is a macro. A callable entity 570 may be represented by a pointer, a name, or a path, among other possibilities.

Entities may be block diagram entities 580 provided in a block diagram environment, such as Simulink® of the MathWorks, Inc. of Natick, Mass. Such block diagram entities 580 may include, for example, a block 582, a subsystem 584, or lines. The blocks may represent data transformation (e.g., elemental dynamic systems) or control behavior (e.g., discrete states) and the lines may represent corresponding relations (e.g., input/output connections, signals, flow of energy, state activity transitions, etc.). A block 582 may be identified by a block name or a block path, among other possibilities.

A subsystem 584 may represent one or more blocks connected by zero or more lines in a block diagram model, and may be identified by a subsystem name, among other possibilities. A subsystem allows a user to provide layers of graphical models within a graphical model to facilitate containment, separation and/or nesting for a part of the graphical model. A user may descend into the subsystem view from the top level to view the details of this subsystem model. A masked subsystem provides encapsulation to control the context, operation, and interaction of the blocks contained in the block diagram. A masked subsystem may allow a user to create a self-contained functional unit that has application-specific parameters. The application-specific parameters may be mapped to generic parameters of the underlying elements in the masked subsystem. The parameters and variables may also be available in a workspace that can be global to the model, a number of models, or to the graphical modeling environment.

Entities may also be state chart entities 590 provided in a statechart environment, such as Stateflow® of The MathWorks, Inc. of Natick, Mass. Such statechart entities 590 may include, for example, a state 592, a subchart 594, and a transition. A state 592 may be identified by a state name or a path, among other possibilities. A subchart 594 may represent one or more states connected by zero or more transitions in a statechart model, and may be identified by a subchart name, among other possibilities. Transitions may be identified by labels, among other possibilities.

Figure 6:
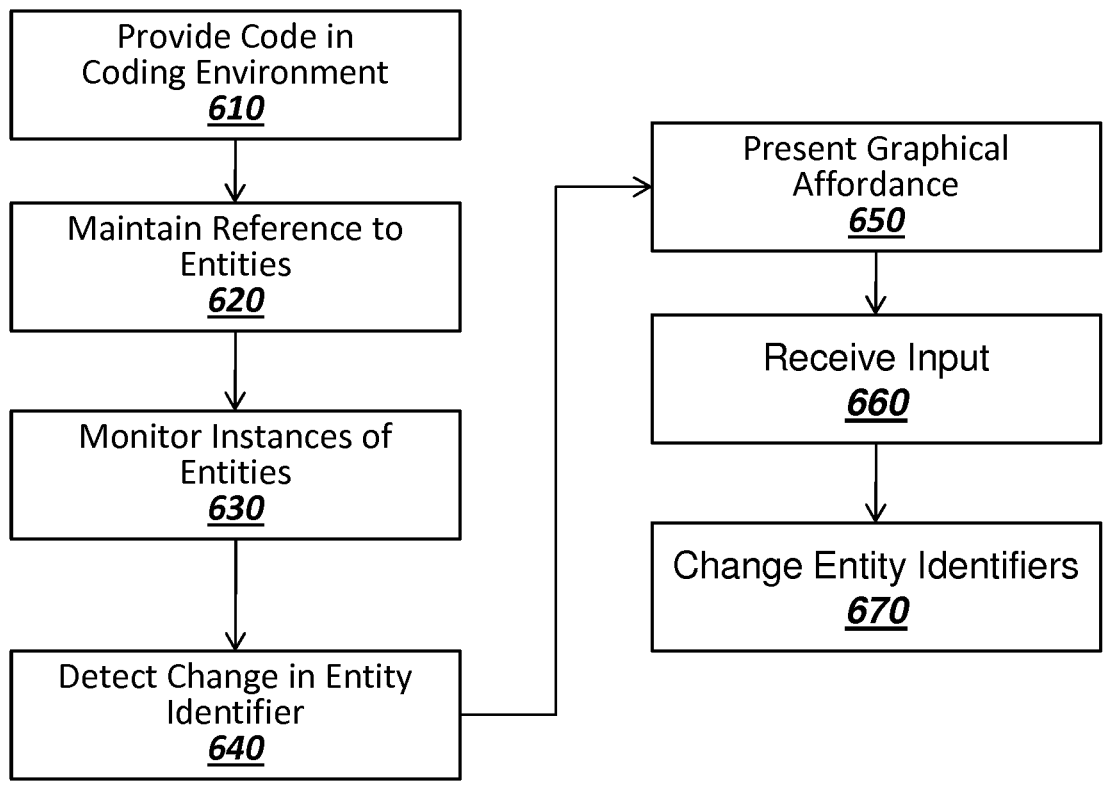
FIG. 6 is a flowchart depicting an exemplary technique for performing a rename in accordance with exemplary embodiments.

In order to propagate changes to an identifier associated with an entity 500, a series of steps may be carried out. For example, FIG. 6 is a flowchart depicting an exemplary technique for performing a rename in accordance with exemplary embodiments of the invention.

At step 610, code may be provided in a coding environment. The code may be, for example, written in a high-level programming language such as one or a combination of Java, Javascript, C#, C++, .NET of the Microsoft Corporation of Redmond, Wash., and MATLAB of the MathWorks, Inc. of Natick, Mass., and/or a modeling language such as one or a combination of time based block diagrams, state transition diagrams, data flow diagrams, class diagrams, sequence diagrams, use case diagrams, Unified Modeling Language (UML) diagrams, physical system modeling languages (e.g., Modelica and Simscape of the Mathworks, Inc. of Natick, Mass.), and the language of Stateflow of the Mathworks, Inc. of Natick, Mass. and/or a markup language such as the hypertext markup language (HTML) and/or extensible markup language (XML). The code may be graphical, such as a graphical block diagram model or a graphical statechart, or textual, or a combination or graphical and textual. The code may also be a low-level language, such as machine code, or a mix of high-level and low-level languages.

The coding environment may be, for example, an integrated development environment, a source code editor, a code generator, a debugger, a modeling environment, or a workspace associated with an environment for editing code. The coding environment may support an editing mode in which a user may edit code.

The coding environment may be associated with a workspace in which, for example, variables may be tracked or modified. The workspace may be accessible from multiple coding environments.

The code in the coding environment may include one or more instances of entities, each instance identified by an identifier. At step 620, a reference to instances of the entities may be maintained. The references may be maintained when a new instance of the entity is created, when an existing instance of the entity is modified, and when an existing instance of the entity is destroyed.

In one embodiment, in order to maintain the references the instances of the entities may be tokenized. The resulting tokens may be used to build an abstract syntax tree or an abstract syntax graph. The abstract syntax tree or abstract syntax graph may represent semi-compiled information associated with the code, and provides a tree or graph representation of the syntactic structure of the code. In another embodiment, a table of locations that identify where in the code instances of the entity are located may be built and maintained.

Instances in the entity may all be in the same environment (such as a graphical model), or may be in different environments (such as in a graphical model and in a workspace associated with the graphical model). At step 620, references may be maintained within a single environment or across multiple environments.

At step 630, the instances of the entities that are present in the code may be monitored for changes. A change may be detected at step 640. For example, the coding environment may determine that a change has been made to an identifier of an entity if the identifier is modified using input from an input device. In some embodiments, the coding environment may determine that a change has been made if, as a result of an editing operation, one or more errors would be introduced into the code (for example, changing the name of a declared function in the function declaration, which results in an inconsistency with a later function call). The change may result in one or more of the instances of the entity being associated with a modified identifier which is different from the entity's initial identifier.

At step 650, a graphical affordance may be presented in response to the detecting. The graphical affordance may indicate, for example that a change will be made to the identifiers associated with other instances of the entity if no action is taken, or if a particular input is received. The graphical affordance may visually distinguish instances of the entity whose identifiers will or will not be changed, or may visually distinguish all instances of the entity, including or not including the instance whose identifier was initially changed. The graphical affordance may provide information, such as the number of instances of the entity in the code.

At step 660, the coding environment may receive input indicating that the change should be made or should not be made. The input may be provided without changing from an editing mode to a separate refactoring mode in the coding environment. Alternatively, the change may be made automatically without any input.

At step 670, the coding environment may utilize the references maintained at step 620 to modify the identifiers associated with instances of the entity. In one embodiment, all of the instances of the entity may be modified to match the modified identifier from step 640. In other embodiments, only some of the identifiers of the other instances of the entity may be changed.

It is possible that the modified identifier of the entity will correspond to an identifier already in use by a different entity. In this case, a warning may be presented to a user before the change is carried out. Alternatively, the change may not be effected and/or user confirmation to make the change may be requested. Yet alternatively, the change may be automatically carried out to thereby change one or more instances of the original entity into instances of the different entity.

The renaming performed in FIG. 6 may be performed across the boundaries of a coding environment. For example, a coding environment may include an editing environment and a workspace, as noted above. The first entity may be a variable in the workspace, and may be associated with a variable name. The second entity may be an element such as a variable or parameter in a block diagram or statechart diagram associated with the workspace. A change to the variable in the workspace may propagate the change to the elements in the block diagram or statechart diagram.

The renaming performed in FIG. 6 may also be performed across the boundaries of individual documents containing the code. For example, if code is distributed among two or more source files, the monitoring and changing of instances of the entity may be performed with respect to each of the source files. The monitoring and changing may be limited to only source files that are opened.

Furthermore, the techniques described herein may be used to substitute one entity for another. For example, consider a block diagram model containing multiple similar blocks. An analysis may be performed to determine which of the blocks include similar inputs, outputs, interfaces, and/or internal operations. If a change is made to one of the blocks, other similar blocks may also be updated to reflect the change. In this way, updates to one block may be propagated through the model so that related blocks may also be updated.

Still further, the techniques described herein may be used to propagate partial changes to instances of different entities that are related, for example, by a prefix or suffix. Such a prefix or suffix may be set distinguished from other parts of the identifier in combination with styles such as underscores, camel case, etc. For example, a plurality of distinct variables may be provided that all start with 'ctx_' (e.g., 'ctx_checksum', 'ctx_index', 'ctx_value' etc.). If the 'ctx' prefix is changed to 'context', the user may intend for the prefix change to be propagated to different entities having the same prefix. Accordingly, a partial identifier match and replace may be performed. The partial identifier match and replace may be based on programming style such as camel case, underscore, etc.

Figure 7:
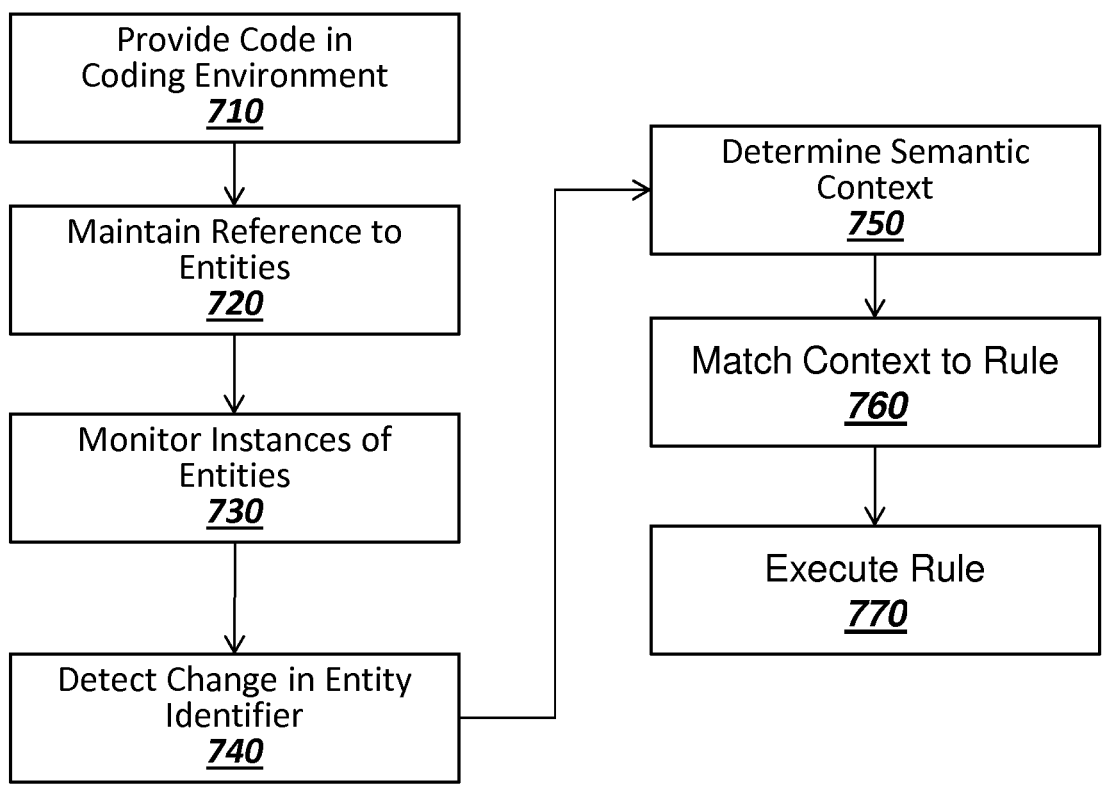
FIG. 7 is a flowchart depicting an exemplary technique for performing a rename based on a semantic analysis in accordance with exemplary embodiments.

In some embodiments, changes to entity identifiers may be carried out selectively. For example, selective changes to entity identifiers may be carried out according to a semantic analysis. For example, FIG. 7 is a flowchart depicting an exemplary technique for performing a rename based on a semantic analysis in accordance with exemplary embodiments of the invention. Steps 710-740 generally correspond to steps 610 and 640 of FIG. 6.

At step 750, a semantic context of the instance of the entity associated with the changed identifier may be determined. The context may represent the way that the instance of the entity is being used. For example, the context may be a variable assignment, a variable use, a function declaration, or a function call. The context may also relate to a scope, such as a code cell, a hierarchy within a block diagram model and/or a statechart diagram. The hierarchy may represent, for example, a nested grouping of systems and subsystems.

The context may be identified through a semantic or syntactic analysis of the code. For example, the context may be identified based on compiled information in the code, based on the use of keywords or operators, or based on an analysis of an abstract syntax tree and/or abstract syntax graph (among other types of data structures that may be used to represent the structure or semantics of the code).

In one example of scope-dependent renaming, if an abstract syntax tree is built in step 720, changing the instance identifiers may include traversing the abstract syntax tree in a downward direction from the instance of the entity whose identifier was initially changed. Accordingly, only the instances of the entity that occur later (e.g., downstream) in the abstract syntax tree than the initially changed entity will be changed so that their identifiers match the modified identifier of the initially changed entity. This technique may be used, for example, to change only the instances of the entity associated with a particular keyword, such as entities within a "while" loop or "for" loop, or within an "if" statement.

At step 760, the context identified at step 750 may be matched to a rule from a collection or set of rules. For example, in an embodiment, the rules may be specified in two parts: a context and an instruction. Optionally, the rules may include a third part, which specifies a subset of the instances of the entity that should be changed. For example, the rules may specify which types of contexts result in the propagation of the change in the identifier and which do not, as well as which instances of the entity are changed and which are not. The instruction may be, for example, to propagate the change to the subset of instances of the entity identified by the rule (or to all instances of the entity, if no subset is supplied by the rule), or to refrain from propagating the change. The contexts referred to in different rules may be the same or may be different.

For example, one rule may indicate that an identifier associated with a second instance of the entity should be changed if the context of a change in the first instance of the entity relates to a variable assignment and a function declaration. A second rule may indicate that a change in the first instance identifier does not prompt a change in the second instance identifier if the entity is used without assigning a value to the entity.

Another example of a rule involves determining whether the change would cause an error, and, if so, to refrain from making the change. For example, if a user edits a variable name and introduces an invalid character or exceeds the maximum character limit for the variable name, the rule may prevent the change from being made, or may allow the change but prevent the change from being propagated.

Still another example of a rule propagates a change to an identifier throughout the code only when two or more instances of the entity have had their identifiers changed, for example by the user, in the same way. This rule may help prevent mistakes and increase the likelihood that the identifier change was intended by the user.

Yet another example of rules involves parse rules. Depending on which parse rule is applied to a statement, a change in identifier may (or may not) be propagated.

More specifically, a formal language may be defined, in part, by formation rules that define a formal grammar for the language. The formation rules may include production rules which, when applied, define the valid strings for the language. In a language with two or more production rules, each of the production rules may be used to design a recognizer for the language. The recognizer may, in turn, include a number of parse rules that correspond to the production rules. The parse rules may be implemented, for example, by function calls.

When code written in the language is parsed, portions of the code may be recognized by one of the parse rules corresponding to a production rule. The portion of the code may include a change to an identifier. Depending on which production rule (or parse rule) is invoked, the change to the identifier may be propagated or not.

The rules may be, for example, predetermined rules stored in a rules repository, user-provided rules, or customized versions of predetermined rules that have been configured by a user. In some embodiments, the rules may be inferred by the coding environment based on previous editing actions. Inferred rules may be applied, or may be presented to a user for approval.

In one example, if the context identified at step 750 relates to a scope in a hierarchy, then only instances of the entity within the same scope as the changed instance may be modified. If, for example, a variable name is changed at a particularly level of a hierarchy present in the code, only variables used at the same level of the hierarchy or lower in the hierarchy may be changed.

At step 770, the coding environment may prompt a change to the additional instance identifiers based on the change in the instance identifier detected at step 740 if the context identified at step 750 matches the context specified in the rule at step 760. If the rule indicates that a change should be made, the change in the identifier may be propagated to instances of the entity as specified in the rule. If the rule indicates that a change should not be made, the coding environment may refrain from changing additional instance identifiers.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG.

8 depicts an example of an electronic device 800 that may be suitable for use with one or more acts disclosed herein.

The electronic device 800 may take many forms, including but not limited to a computer, workstation, server, network computer, quantum computer, optical computer, Internet appliance, mobile device, a pager, a tablet computer, a smart sensor, application specific processing device, etc.

Figure 8:
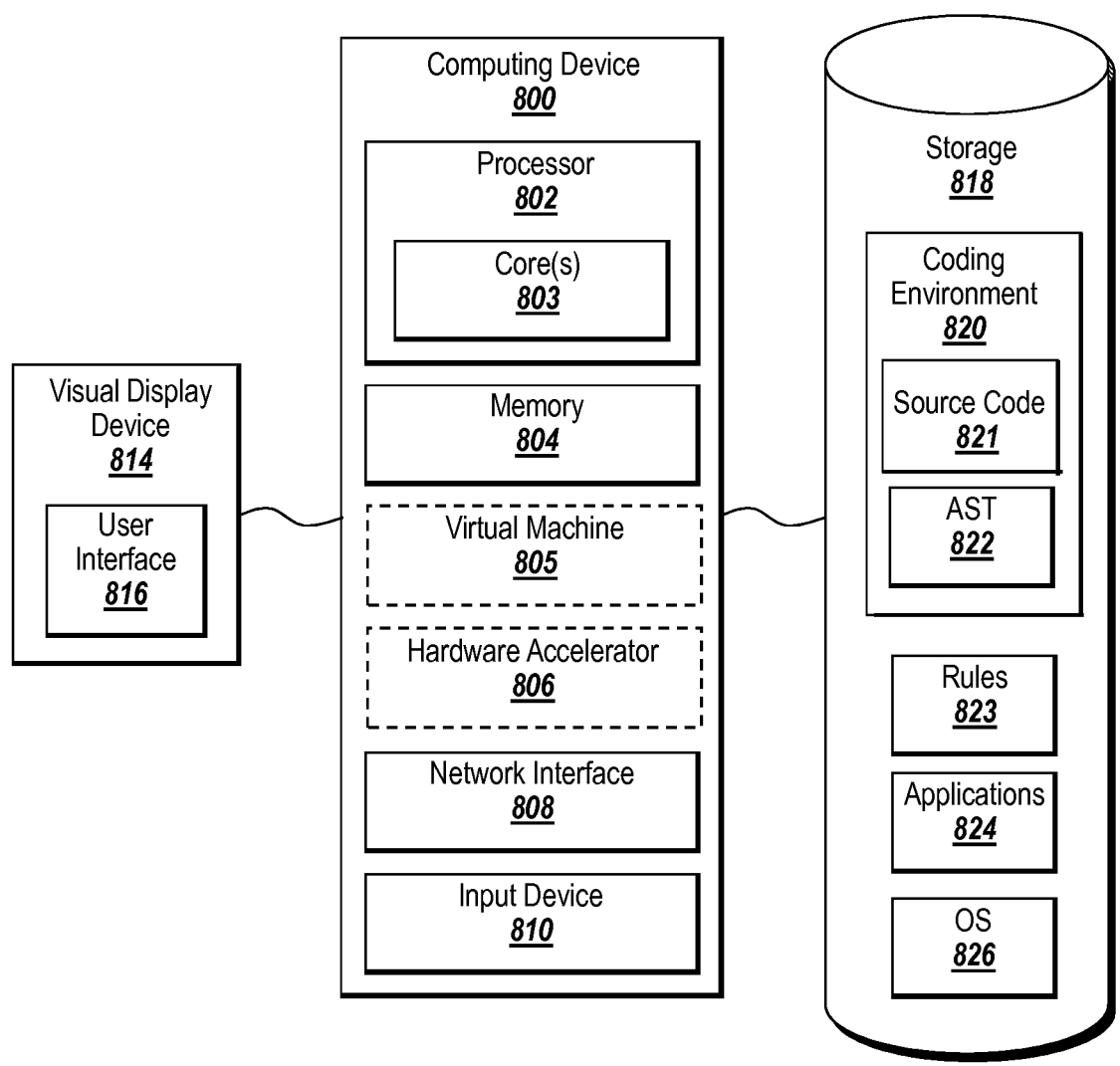
FIG. 8 is a block diagram representation of an exemplary computing device 800 for practicing exemplary embodiments.

The electronic device 800 is illustrative and may take other forms. For example, an alternative implementation of the electronic device 800 may have fewer components, more components, or components that are in a configuration that differs from the configuration of FIG. 8. The components of FIG. 8 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 802 may include hardware based logic or a combination of hardware based logic and software to execute instructions on behalf of the electronic device 800. The processor 802 may include logic that may interpret, execute, and/or otherwise process information contained in, for example, the memory 804. The information may include computer-executable instructions and/or data that may implement one or more embodiments of the invention. The processor 802 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 803. Moreover, the processor 802 may include a system-on-chip (SoC) or system-in-package (SiP). An example of a processor 802 is the Intel® Xeon® processor available from Intel Corporation, Santa Clara, Calif.

The electronic device 800 may include one or more tangible non-transitory computer-readable storage media for storing one or more computer-executable instructions or software that may implement one or more embodiments of the invention. The non-transitory computer-readable storage media may be, for example, the memory 804 or the storage 818. The memory 804 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 800 may include a virtual machine (VM) 805 for executing the instructions loaded in the memory 804. A virtual machine 805 may be provided to handle a process running on multiple processors so that the process may appear to be using only one computing resource rather than multiple computing resources. Virtualization may be employed in the electronic device 800 so that infrastructure and resources in the electronic device may be shared dynamically. Multiple VMs 805 may be resident on a single computing device 800.

A hardware accelerator 806, may be implemented in an ASIC, FPGA, or some other device. The hardware accelerator 806 may be used to reduce the general processing time of the electronic device 800.

The electronic device 800 may include a network interface 808 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 800 to any type of network capable of communication and performing the operations described herein.

The electronic device 800 may include one or more input devices 810, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 810 may allow a user to provide input that is registered on a visual display device 814. A graphical user interface (GUI) 816 may be shown on the display device 814.

A storage device 818 may also be associated with the computer 800. The storage device 818 may be accessible to the processor 802 via an I/O bus. The information may be executed, interpreted, manipulated, and/or otherwise processed by the processor 802. The storage device 818 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 818 may be used for storing application software programs, such as a coding environment 820 (which may be, for example the MATLAB® environment or the Simulink® environment). The coding environment 820 may support source code 821 and may maintain an abstract syntax tree 822 associated with the coding environment 820. The abstract syntax tree may represent, for example, partially compiled information relating to the source code 821.

The coding environment 820 may be part of a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

An alternative embodiment may implement a TCE in a graphically-based TCE using products such as, but not limited to, Simulink®, Stateflow®, SimEvents®™ Simscape™, etc., by The MathWorks, Inc.; VisSim by Visual Solutions; LabView® by National Instruments; Dymola by Dassault SystèmesDynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) such as the Object Constraint Language (OCL) or SysML environment.

The storage device 818 may further store applications 824, and the electronic device 800 can be running an operating system (OS) 826. Examples of OS 826 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 9:
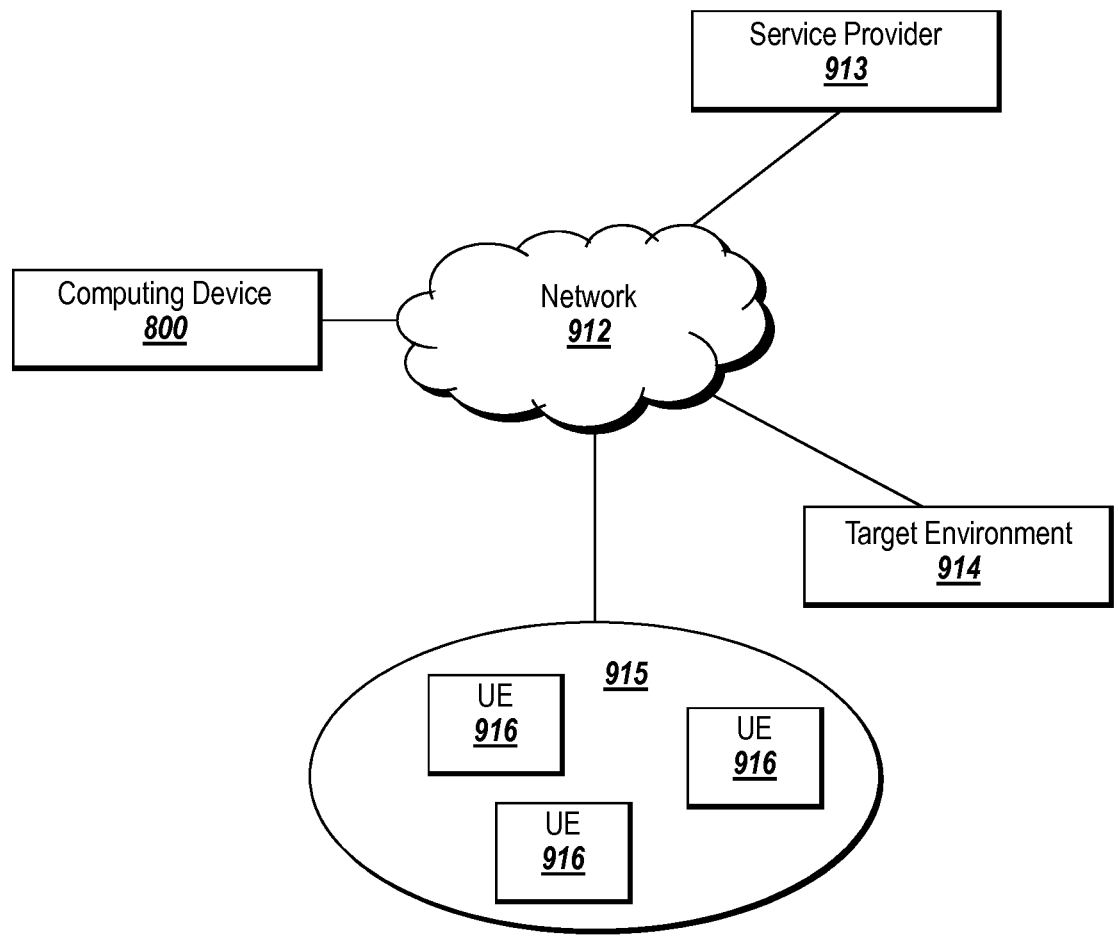
FIG. 9 is a block diagram representation of an exemplary network embodiment suitable for practicing exemplary embodiments.

FIG. 9 depicts a network implementation that may implement one or more embodiments of the invention. A system 900 may include a computing device 800, a network 912, a service provider 913, a target environment 914, and a cluster 915. The embodiment of FIG. 9 is exemplary, and other embodiments can include more devices, fewer devices, or devices in arrangements that differ from the arrangement of FIG. 9.

The network 912 may transport data from a source to a destination. Embodiments of the network 912 may use network devices, such as routers, switches, firewalls, and/or servers (not shown) and connections (e.g., links) to transport data. Datamay refer to any type of machine-readable information having substantially any format that may be adapted for use in one or more networks and/or with one or more devices (e.g., the computing device 800, the service provider 913, etc.). Data may include digital information or analog information. Data may further be packetized and/or non-packetized.

The network 912 may be a hardwired network using wired conductors and/or optical fibers and/or may be a wireless network using free-space optical, radio frequency (RF), and/or acoustic transmission paths. In one implementation, the network 912 may be a substantially open public network, such as the Internet. In another implementation, the network 912 may be a more restricted network, such as a corporate virtual network. The network 912 may include Internet, intranet, Local Area Network (LAN), Wide Area Network (WAN), Metropolitan Area Network (MAN), wireless network (e.g., using IEEE 802.11), or other type of network The network 912 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 913 may include a device that makes a service available to another device. For example, the service provider 913 may include an entity (e.g., an individual, a corporation, an educational institution, a government agency, etc.) that provides one or more services to a destination using a server and/or other devices. Services may include instructions that are executed by a destination to perform an operation (e.g., an optimization operation).

Alternatively, a service may include instructions that are executed on behalf of a destination to perform an operation on the destination's behalf.

The target environment 914 may include a device that receives information over the network 912. For example, the target environment 914 may be a device that receives user input from the computer 800.

The cluster 915 may include a number of units of execution (UEs) 916 and may perform processing on behalf of the computer 800 and/or another device, such as the service provider 913. For example, the cluster 915 may perform parallel processing on an operation received from the computer 800. The cluster 915 may include UEs 916 that reside on a single device or chip or that reside on a number of devices or chips.

The units of execution (UEs) 916 may include processing devices that perform operations on behalf of a device, such as a requesting device. A UE may be a microprocessor, field programmable gate array (FPGA), and/or another type of processing device. UE 916 may include code, such as code for an operating environment. For example, a UE may run a portion of an operating environment that pertains to parallel processing activities. The service provider 913 may operate the cluster 915 and may provide interactive optimization capabilities to the computer 800 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of a electronic device, unless otherwise stated.

It is intended that the invention not be limited to the particular embodiments disclosed above, but that the invention will include any and all particular embodiments and equivalents falling within the scope of the following appended claims.

The invention claimed is:

1. A method, comprising:
   storing references to a plurality of variable instance identifiers in storage;
   detecting a first change made to a first variable instance identifier in programming code while in an editing mode in which the programming code is editable,
   the first variable instance identifier being from the plurality of variable instance identifiers,
   the first change being made when the programming code is editable, and
   the detecting performed using one or more processors; and
   applying at least one rule to automatically make a second change to a second variable instance identifier responsive to the detecting the first change to the first variable instance identifier and based on a context of the first change, the at least one rule specifying when a given change to one of the plurality of variable instance identifiers is propagated to another of the plurality of variable instance identifiers based on the context of the given change, wherein the at least one rule is a predetermined rule, a user-defined rule, a customized version of a predetermined rule or an inferred rule, the second change being made based on the context of the first change,
   the second variable instance identifier is identified using one of the stored references,
   the second change made to the second variable instance identifier being made based on the change to the first variable instance identifier, and
   the applying performed using the processor without changing from the editing mode to a different mode and without requesting refactoring in the different mode.

2. A computer-implemented method comprising:
   storing references to a first instance identifier and a second instance identifier in a storage;
   monitoring with one or more processors the first instance identifier and the second instance identifier during an editing mode in which programming code is editable;
   receiving an instruction related to the programming code,
   the instruction modifying the first instance identifier to produce a modified identifier,
   the instruction received while the programming code is being edited during the editing mode; and
   automatically modifying the second instance identifier responsive to the modifying of the first instance identifier based on a relationship rule without changing from the editing mode to another mode and without requesting refactoring in the another mode the relationship rule indicating a relationship between instance identifiers associated with an entity in the programming code, the instance identifiers include the first instance identifier and the second instance identifier wherein the relationship is a predetermined rule, a user-defined rule, a customized version of a predetermined rule or an inferred rule,
   the second instance identifier is identified via one of the stored references;
   the modified second instance identifier matching the modified identifier, and
   the automatically modifying performed using the one or more processors.

3. A device, comprising:
   a storage for storing references to a first instance identifier and a second instance identifier;
   a processor executing instructions to:
   monitor the first instance identifier and the second instance identifier during an editing mode related to programming code,
   receive an instruction related to the programming code,
   modify, based on the received instruction, the first instance identifier to produce a modified identifier,
   the modifying performed while the programming code is being edited during the editing mode in which the programming code is editable, interact with a relationship rule,
   the interacting with the relationship rule associated with the modifying of the first instance identifier, and
   wherein the relationship rule is a predetermined rule, a user-defined rule, a customized version of a predetermined rule or an inferred rule,
   modify, automatically, the second instance identifier, which is identified via the stored reference to the second instance identifier, responsive to the modifying of the first instance identifier based on the relationship rule in the editing mode without changing to another mode and without requesting refactoring in the another mode, the modified second instance identifier matching the modified identifier.

4. A non-transitory computer-readable medium storing instruction, the instructions including one or more instructions that when executed by a processor, cause the processor to:
   store references to a first variable instance identifier and to a second variable instance identifier;
   detect a first change made to the first variable instance identifier in programming code,
   the first variable instance identifier being from a plurality of variable instance identifiers,
   the first change being made when the programming code is editable in an editing mode; and
   apply at least one rule to automatically make a second change to the second variable instance identifier, which is identified via the stored reference to the second variable instance identifier, responsive to the detecting the first change to the first variable instance identifier and based on a context of the change, the at least one rule identifying when a change to one of the plurality of variable instance identifiers is propagated to another of the plurality of variable instance identifiers based on the context of the change, wherein the at least one rule includes a predetermined rule, a user-defined rule, a customized version of a predetermined rule or an inferred rule, the second change being made based on the context of the first change, the second change made to the second variable instance identifier being made based on the change to the first variable instance identifier without changing from the editing mode to a different mode and without requesting refactoring in the different mode.

5. A non-transitory computer-readable medium storing instruction, the instructions including one or more instructions that when executed by a processor, cause the processor to:
- store references to a first instance identifier and a second instance identifier in a storage;
- monitor the first instance identifier and the second instance identifier during an editing mode in which programming code is editable;
- receive an instruction related to the programming code,
  - the instruction modifying the first instance identifier to produce a modified identifier,
  - the instruction received while the programming code is being edited during the editing mode; and
- automatically modify the second instance identifier, which is identified via the stored reference to the second instance identifier, responsive to the modifying of the first instance identifier based on a relationship rule without changing from the editing mode to a different mode and without requesting refactoring in the different mode, the relationship rule indicating a relationship between instance identifiers associated with an entity in the programming code wherein the relationship rule is a predetermined rule, a user-defined rule, a customized version of a predetermined rule or an inferred rule, the instance identifiers include the first instance identifier and the second instance identifier, the modified second instance identifier matching the modified identifier.

* * * * *